UNITED STATES PATENT OFFICE.

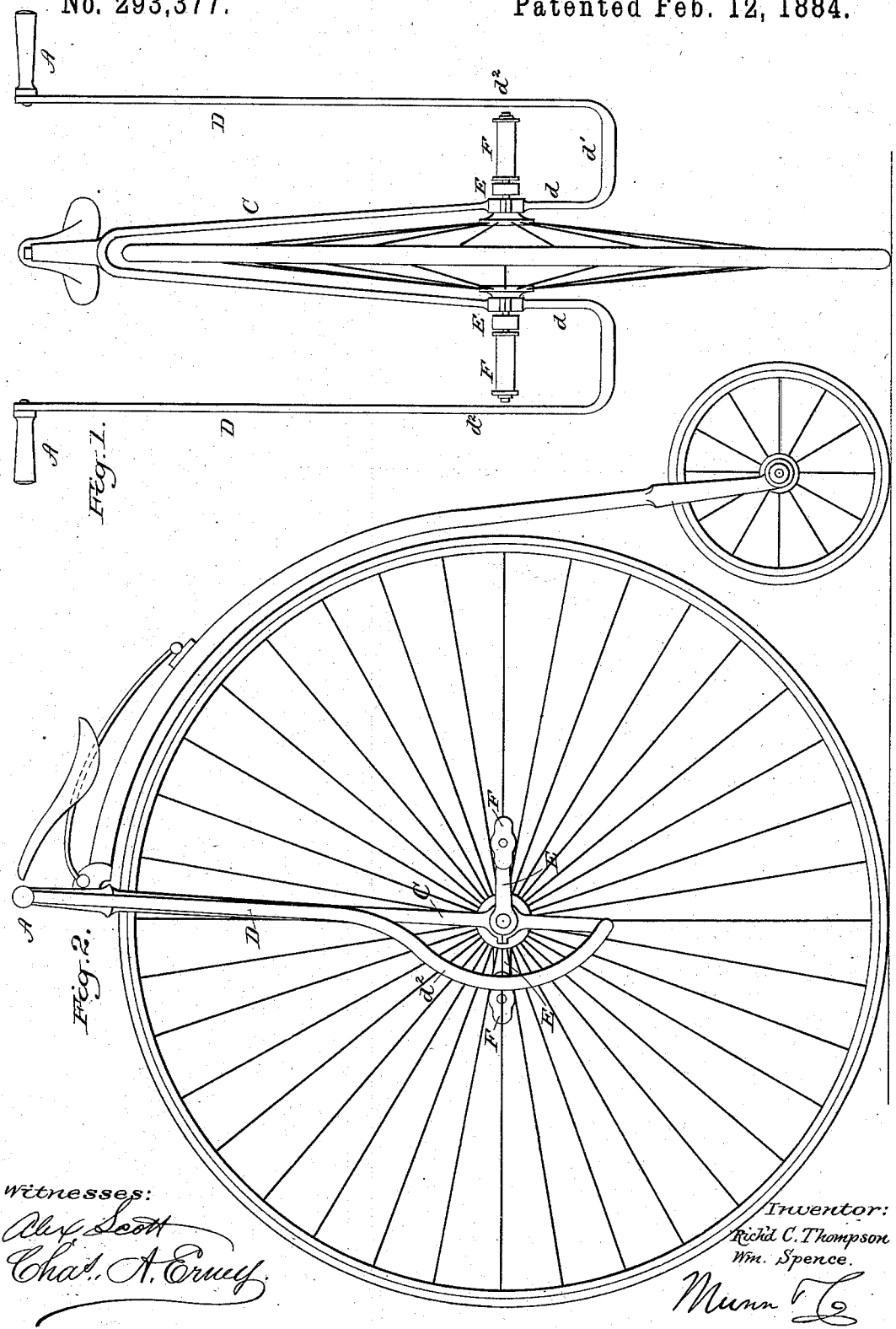

RICHARD COMINGS THOMPSON, OF BRIXTON, AND WILLIAM SPENCE, OF SURBITON, COUNTY OF SURREY, ENGLAND.

BICYCLE.

SPECIFICATION forming part of Letters Patent No. 293,377, dated February 12, 1884.

Application filed December 4, 1883. (No model.)

*To all whom it may concern:*

Be it known that we, RICHARD COMINGS THOMPSON, of Brixton, and WILLIAM SPENCE, of Surbiton, both in the county of Surrey, England, subjects of the Queen of Great Britain, have invented an Improvement in Bicycles, of which the following is a specification.

Our invention relates to what may be termed by analogy an "open-fronted" bicycle—that is to say, a bicycle in which there is no obstruction to the rider's legs in the forward direction, so that in the event of the rider being thrown forward in consequence of the wheel meeting an obstacle, or from any other cause, he will not be thrown on his face in consequence of his legs catching against the steering-handle, as usually happens.

According to our invention, the steering-handles occupy the usual position; but instead of being attached to the usual cross-bar fixed onto the head of the steering-fork, they are attached to prolongations of the lower extremities of the two branches of the steering-fork, which are continued beyond the bearings of the driving-wheel, so as to pass under or beyond the orbit of the pedals, and then in an upward direction, the steering-handles being fixed to the extremities of these prolongations. These prolongations take such a direction as, while clearing the cranks and pedals, to form no obstruction in dismounting by the pedal in the usual way, at the same time they are situated at such a distance laterally from the steering-fork as to admit of the rider's legs passing freely between them and the fork, so that should the rider be thrown he would pass clear over the head of the steering-fork and alight on his feet without being entangled in the machine. As a result of this arrangement, the rider has the further advantage of being able to sit more directly over his work than it would be safe to do with an ordinary bicycle.

In the accompanying drawings, Figure 1 represents a front elevation, and Fig. 2 a side elevation, of our improved bicycle.

The same letters of reference indicate the same parts in both figures.

A A are the handles, occupying the same position as when fixed on the ends of the ordinary cross-bar. C is the steering-fork, jointed to the backbone B by any ordinary construction of head, the height of the head being, however, reduced as much as possible, consistently with the necessary strength of the joint, so as to allow of the horn of the saddle projecting over the top of the head and avoid liability of any part of the rider's person catching against the head of the fork when thrown over it. The handles A are fixed to the upper ends of arms D, which form extensions of the arms of the steering-fork C, said arms D being forged or fixed upon the lower extremities of the limbs of said fork, and of such shape as to pass inside of the path described by the driving-cranks E in a downward or forward direction, and then outwardly under or beyond the path of the treadles F, and finally upward to any desired height for handles A. The cranks and pedals thus revolve within the bends of these extensions D, and quite clear of the same. In the drawings we have shown the part $d$ of the extensions D as passing vertically downward and the part $d'$ as passing across beneath the lowest point of the orbit of the pedal; but we do not limit ourselves to this precise form, as the part $d$ may be inclined forward and the part $d'$ may pass more or less in front of the said orbit, provided it is low enough to offer no obstruction to the rider's foot, whatever may be the position of the crank at the moment when the rider is thrown. We have shown the part $d^2$ of the extensions as curved forward, to offer no impediment to dismounting by the pedal in the usual manner, and the upper parts of the extensions D are represented as having the same rake as the steering-fork; but it will be obvious that they may be curved or carried more or less forward at $d^2$, as may be required, and may have any desired degree of rake, and the handles A may either be abreast of the steering-head or more or less forward or rearward of it, as desired, the essential feature of the invention being that there is a clear passage for the rider's legs between the steering-handles A and the steering-fork and head.

Having described the nature of the said invention and the manner of performing the same, we declare that what we claim is—

The combination, with the steering-fork of a bicycle, of extensions or arms attached rigidly to the lower extremities of the said fork or formed in one therewith and passing beyond and clear of the paths described by the cranks and pedals and rising at either side of the steering-fork at such a distance therefrom as to admit the rider's legs between them and the fork, and of handles attached to the upper ends of said arms or extensions, substantially as shown and described, for the purpose specified.

RICHARD COMINGS THOMPSON.
WILLIAM SPENCE.

Witnesses:
 JNO. DEAN,
 HERBERT E. DALE,
Both of 17 Gracechurch Street, London.